US009075333B2

(12) United States Patent
Uematsu et al.

(10) Patent No.: US 9,075,333 B2
(45) Date of Patent: Jul. 7, 2015

(54) CHARGING MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Atsushi Uematsu, Fuji (JP); Tomohito Taniguchi, Suntou-gun (JP); Taichi Sato, Numazu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/288,810

(22) Filed: May 28, 2014

(65) Prior Publication Data

US 2014/0270853 A1 Sep. 18, 2014

Related U.S. Application Data

(63) Continuation of application No. PCT/JP2013/007266, filed on Dec. 10, 2013.

(30) Foreign Application Priority Data

Dec. 12, 2012 (JP) ................................ 2012-271507
Dec. 3, 2013 (JP) ................................ 2013-250455

(51) Int. Cl.

| | |
|---|---|
| ***G03G 15/02*** | (2006.01) |
| ***B32B 3/00*** | (2006.01) |
| ***B05C 1/08*** | (2006.01) |
| ***G03G 21/18*** | (2006.01) |

(52) U.S. Cl.
CPC ... *G03G 15/0233* (2013.01); *Y10T 428/249973* (2015.04); *G03G 21/18* (2013.01)

(58) Field of Classification Search
CPC ................................................ G03G 15/0233
See application file for complete search history.

(56) References Cited

U.S. PATENT DOCUMENTS

| | | | | |
|---|---|---|---|---|
| 6,243,552 | B1 * | 6/2001 | Murata | 399/176 |
| 6,952,553 | B2 | 10/2005 | Sakakibara et al. | |
| 8,548,359 | B2 | 10/2013 | Taniguchi et al. | |
| 2013/0236214 | A1 * | 9/2013 | Koide et al. | 399/176 |
| 2014/0270853 | A1 * | 9/2014 | Uematsu et al. | 399/176 |

FOREIGN PATENT DOCUMENTS

| | | | |
|---|---|---|---|
| JP | 2001-82452 | A | 3/2001 |
| JP | 2004-279578 | A | 10/2004 |
| JP | 2006-227334 | A | 8/2006 |
| JP | 2009-9056 | A | 1/2009 |
| JP | 2009-134310 | A | 6/2009 |
| JP | 2012-220583 | A | 11/2012 |

* cited by examiner

*Primary Examiner* — WB Perkey
(74) *Attorney, Agent, or Firm* — Fitzpatrick, Cella, Harper & Scinto

(57) ABSTRACT

Provided is a charging member for suppressing the vibration of a charging roller which occurs owing to a difference in circumferential speed in a longitudinal direction when the roller is rotated to follow a photosensitive member, and suppressing a banding image caused by the vibration of the charging roller over a long period of time. The charging member includes a substrate and an elastic layer. The elastic layer contains a rubber having a polar group and hollow particles each having a shell containing a crystal of calcium carbonate.

10 Claims, 3 Drawing Sheets

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2013/007266, filed Dec. 10, 2013, which claims the benefit of Japanese Patent Applications No. 2012-271507, filed Dec. 12, 2012 and No. 2013-250455, filed Dec. 3, 2013.

BACKGROUND OF THE INVENTION

1. Field of the Invention

The present invention relates to a charging member, a process cartridge, and an electrophotographic apparatus.

2. Description of the Related Art

In an electrophotographic image forming apparatus (hereinafter referred to as "electrophotographic apparatus"), a roller-shaped charging member used for contact charging of an electrophotographic photosensitive member serving as a body to be charged generally has an elastic layer so as to ensure a sufficient nip width with respect to the photosensitive member. It is to be noted that, hereinafter, the electrophotographic photosensitive member is also referred to as "photosensitive member", and the charging member is also referred to as "charging roller".

In recent years, there has been a demand for increases in speed and durability, and enhancement of image quality, of an electrophotographic apparatus, and in a printer of a medium speed or more requiring high-speed drive, the vibration of a photosensitive member increases along with high-speed drive. The vibration of the photosensitive member causes the contact between a charging roller and the photosensitive member to be unstable, and hence the charging of the surface of the photosensitive member by the charging roller becomes non-uniform, with the result that an electrophotographic image with lateral streak-like uneven image density (hereinafter sometimes referred to as "banding image") is formed in some cases.

As a technique of suppressing the influence on the charging roller by the vibration of the photosensitive member, Japanese Patent Application Laid-Open No. 2004-279578 discloses a charging roller using an electroconductive foam elastic layer. Further, Japanese Patent Application Laid-Open No. 2009-134310 discloses an electrophotographic member containing an inorganic balloon such as a silica balloon or a carbon balloon in an elastic layer.

SUMMARY OF THE INVENTION

In Japanese Patent Application Laid-Open No. 2004-279578, it is presumed that foamed cells in the foam elastic layer are deformed to reduce the influence by the vibration of the photosensitive member. However, according to the study by the inventors of the present invention, in the case where the charging roller according to Japanese Patent Application Laid-Open No. 2004-279578 is used, the restoration of the foamed cells after the deformation is not sufficient, and hence the suppressing effect on the vibration is not kept over a long period of time, and a banding image is formed in the latter half of durability time in some cases.

Further, in the case of the inorganic balloon according to Japanese Patent Application Laid-Open No. 2009-134310, the inorganic balloon has elasticity higher than that of the foamed cells of Japanese Patent Application Laid-Open No. 2004-279578. Therefore, the inorganic balloon is restored rapidly after being deformed, but the suppressing effect on the vibration is not sufficient. Thus, it is recognized that it is necessary to develop a charging member capable of suppressing the formation of a banding image by reducing the influence by the vibration of a photosensitive member over a long period of time.

The present invention is directed to providing a charging member of an electrophotographic apparatus which suppresses the formation of a banding image caused by the vibration of a photosensitive member over a long period of time.

The present invention is also directed to providing a process cartridge and an electrophotographic apparatus capable of forming stable electrophotographic images of high quality.

According to one aspect of the present invention, there is provided a charging member, including: a substrate; and an elastic layer, in which the elastic layer contains a rubber having a polar group and a hollow particle having a shell containing a crystal of calcium carbonate.

In addition, according to another aspect of the present invention, there is provided an electrophotographic apparatus, including: a charging member; and an electrophotographic photosensitive member disposed in contact with the charging member, in which the charging member is the charging member described above.

Further, according to still another aspect of the present invention, there is provided a process cartridge integrally holding a charging member and at least an electrophotographic photosensitive member, the process cartridge being configured to be detachable from a main body of an electrophotographic apparatus, in which the charging member is the charging member described above.

According to the present invention, a charging member which suppresses the formation of a banding image caused by the vibration of a photosensitive member over a long period of time can be obtained.

Further, according to the present invention, a process cartridge and an electrophotographic apparatus capable of stably forming electrophotographic images of high quality can be obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A charging member includes a substrate and an elastic layer, and is used for charging a body to be charged. The elastic layer contains a rubber having a polar group (hereinafter sometimes referred to as "polar rubber") and hollow particles each having a shell containing crystals of calcium carbonate. Hereinafter, the shell containing crystals of calcium carbonate is sometimes merely referred to as "shell." Further, hollow particles each having the shell are sometimes referred to as "calcium carbonate hollow particles."

By virtue of the effect of the calcium carbonate hollow particles, tan δ of the elastic layer increases. The "tan δ" refers to a value obtained by dividing a loss modulus E" by a storage modulus E' in a high-molecular compound which is a viscoelastic body, and is an index indicating the ability to lose energy as heat during deformation of the viscoelastic body. When tan δ of the elastic layer is large, the vibration can be lost as heat energy efficiently during the deformation of the elastic layer, and hence the influence of the vibration of the photosensitive member can be reduced.

In the case of calcium carbonate hollow particles, a sufficient increase in tan δ is recognized over a long period of time by virtue of the effects (i) and (ii) described below. Therefore, the formation of a banding image can be suppressed over a long period of time by: reducing the vibration of a photosensitive member caused by a drive section with an elastic layer of a charging member; and stabilizing the contact state between the photosensitive member and the charging member.

(i) Deformation and Restoration of Shell

Figure 1:
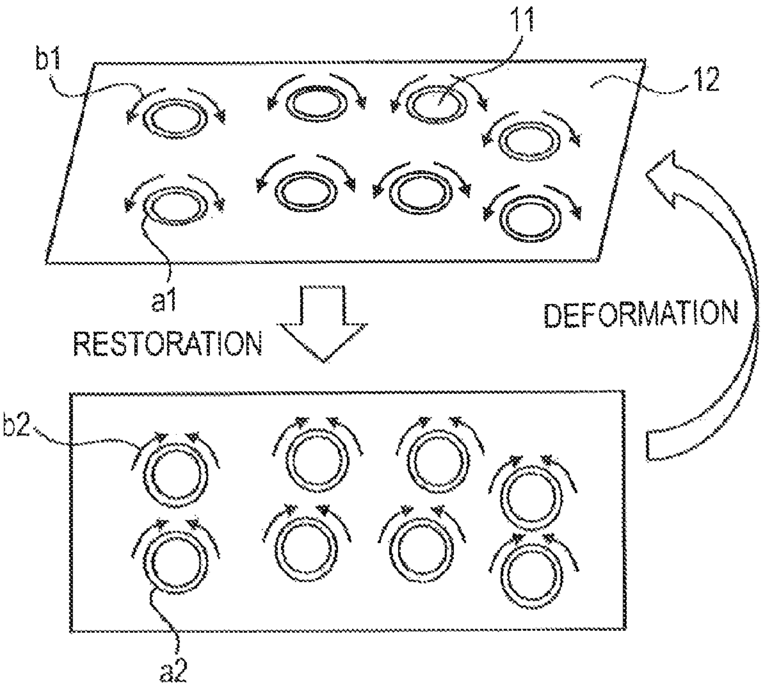
FIG. 1 is a schematic view illustrating an interaction between a rubber having a polar group and hollow particles each having a shell containing crystals of calcium carbonate in an elastic layer of a charging roller according to one embodiment of the present invention.

As indicated by a1 in FIG. 1, when a shell containing calcium carbonate crystals of a calcium carbonate hollow particle 11 in an elastic layer is deformed, tan δ increases. After the deformation, the shell is rapidly restored as indicated by a2, and hence the increase in tan δ is kept over a long period of time.

It is to be noted that the vibration loss by the deformation of the shell becomes higher in a porous structure in which a great number of connection holes are present in the shell. This is because air in the shell moves through the connection holes in the shell to suppress an increase in internal pressure in the shell, which enables greater deformation of the shell.

(ii) Displacement and Restoration of Rubber Molecules

In the hollow particles each having a shell formed of, for example, a metal oxide such as silica and carbon described in Japanese Patent Application Laid-Open No. 2009-134310, the interaction between the shell and the polar group of a polar rubber in the elastic layer becomes large owing to the presence of a great number of surface functional groups on the shell. Therefore, the binding force of the surrounding polar rubber molecules with respect to the shell surface is large, and the displacement of the polar rubber molecules on the periphery of the shell becomes small, with the result that an increase in tan δ is not sufficient.

In calcium carbonate hollow particles, a shell is formed of crystals of calcium carbonate, and hence the number of surface functional groups on the shell is remarkably small, with the result that the interaction between the shell and a polar rubber 12 in the elastic layer is small. Thus, the binding force of the polar rubber molecules on the periphery of the shell with respect to the shell surface is small, and hence the polar rubber molecules are greatly displaced as indicated by an arrow b1 of FIG. 1 to increase tan δ. Further, as indicated by an arrow b2 of FIG. 1, the polar rubber molecule is rapidly restored, and hence the increase in tan δ is kept over a long period of time.

It is to be noted that, as the crystal amount and crystallinity of the calcium carbonate crystals of the shell are higher, the vibration loss by the displacement and restoration of the polar rubber molecules can further reduce the interaction between the polar rubber molecules and the shell surface, and hence the effect of vibration loss is further enhanced.

(1) Charging Member

Figures 2A, 2B, 2C:
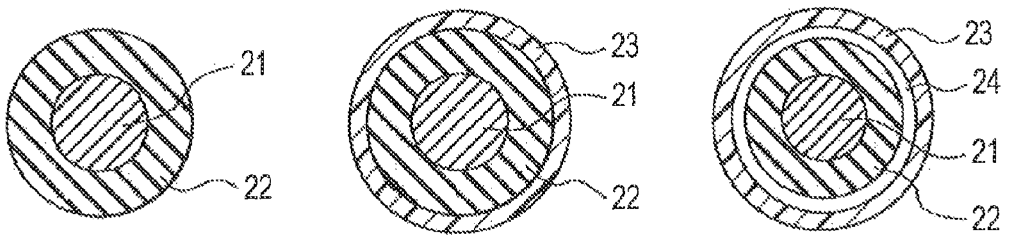
FIG. 2A is a view illustrating a layer configuration of a cross-section of the charging roller according to one embodiment of the present invention.
FIG. 2B is a view illustrating a layer configuration of a cross-section of the charging roller according to one embodiment of the present invention.
FIG. 2C is a view illustrating a layer configuration of a cross-section of the charging roller according to one embodiment of the present invention.

FIGS. 2A to 2C are schematic views each illustrating an example of a cross-section of a charging member. Charging members of FIGS. 2A to 2C each have a roller shape. Each of the roller-shaped charging members illustrated in FIGS. 2A to 2C, that is, a charging roller is described below in detail.

FIG. 2A illustrates a charging roller including an electroconductive substrate 21 and an electroconductive elastic layer 22.

FIG. 2B illustrates a charging roller including a surface layer 23 in addition to the electroconductive substrate 21 and the electroconductive elastic layer 22.

FIG. 2C illustrates a charging roller further including an intermediate layer 24 between the electroconductive elastic layer 22 and the surface layer 23 in FIG. 2B.

The charging roller is used in contact with a photosensitive member. Therefore, it is preferred that the charging roller have the surface layer 23 as illustrated in FIGS. 2B and 2C from the viewpoint of durability.

The electroconductive substrate 21 and the electroconductive elastic layer 22 or layers (for example, the electroconductive elastic layer 22 and the surface layer 23 illustrated in FIG. 2B) to be successively laminated on the electroconductive substrate 21 may be caused to adhere to each other through intermediation of an adhesive. In this case, it is preferred that the adhesive be electroconductive. In order to impart conductivity to the adhesive, the adhesive may contain a known conducting agent.

A thermosetting resin or a thermoplastic resin is given as a binder resin for the adhesive, and the following known resins may be used: a urethane-based resin, an acrylic resin, a polyester-based resin, a polyether-based resin, and an epoxy-based resin.

One kind of conducting agent alone, or a combination of two or more kinds, appropriately selected from conducting agents to be described in detail later may be used as the conducting agent for imparting conductivity to the adhesive.

It is more preferred that the charging roller generally have an electric resistance of $1\times10^{2}\Omega$ or more and $1\times10^{10}\Omega$ or less in a 23° C./50% RH environment so as to charge the photosensitive member satisfactorily. Measurement of the electric resistance of the charging roller is described later.

It is preferred that the charging roller have such a shape that its outer diameter is largest at a central portion in its longitudinal direction and becomes smaller along a direction toward each of both of its ends in the longitudinal direction, which is so called a crown shape, from the viewpoint of the uniformization of a longitudinal nip width with respect to the photosensitive member. A crown amount is preferably such that a difference between an outer diameter at the central portion and an outer diameter at a position distant from the central portion by 90 mm in the longitudinal direction is 30 μm or more and 200 μm or less.

It is more preferred that the charging roller have a ten-point average roughness Rzjis (μm) of its surface of 3 μm or more and 30 μm or less and a depression-protrusion average interval Sm (μm) of its surface of 15 μm or more and 150 μm or less. Setting the ten-point average surface roughness Rzjis and depression-protrusion average interval Sm of the surface of the charging roller within the ranges can additionally stabilize a state in which the charging roller and the photosensitive member are brought into contact with each other. Thus, the charging roller can uniformly charge the photosensitive member with ease.

Methods of measuring the ten-point average roughness Rzjis of the surface of the charging roller and the depression-protrusion average interval Sm of the surface are described later.

The hardness of the surface of the charging roller is preferably 90° or less, more preferably 40° or more and 80° or less in terms of microhardness (Model MD-1). When the microhardness is set in such range, the contact of the charging roller with the photosensitive member can be stabilized with ease, and more stable discharge can be performed.

It is to be noted that the term "microhardness (Model MD-1)" refers to the hardness of the charging roller measured with an ASKER micro-rubber hardness meter Model MD-1 (trade name, manufactured by KOBUNSHI KEIKI CO., LTD.). Specifically, the hardness is a value of the charging roller, which has been left to stand in a normal-temperature and normal-humidity (23° C./55% RH) environment for 12 hours or more, measured with the hardness meter according to a 10-N peak hold mode.

[Measurement of Electric Resistance of Charging Roller]

Figure 3:
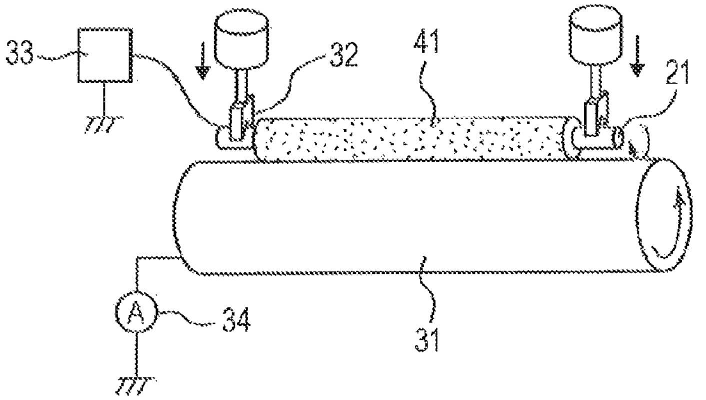
FIG. 3 is a schematic view of a device to be used for measuring an electric resistance of the charging roller according to one embodiment of the present invention.

FIG. 3 illustrates an electric resistance measurement device of a charging roller. Both ends of the electroconductive substrate 21 are brought into abutment with a columnar metal 31 having the same curvature as that of the photosensitive member by loaded bearings 32 so as to be parallel to the metal in an axial direction. In this state, the columnar metal 31 is rotated with a motor (not shown), and then a DC voltage of −200 V is applied from a stabilized power supply 33 to a charging roller 41 while the charging roller 41 is rotated to follow the rotation of the metal. A current flowing at this time is measured with an ammeter 34, and then the resistance of the charging roller 41 is calculated. In the present invention, the load applied to each of both ends of the electroconductive substrate 21 was set to 4.9 N, the diameter of the metallic columnar metal 31 was set to φ30 mm, and the rotation speed thereof was set to a circumferential speed of 45 mm/sec.

[Measurement of Surface Roughness of Charging Roller]

Measurement is performed in conformity with a surface roughness specification by JIS B0601-1994 with a surface roughness-measuring machine (trade name: SE-3500, manufactured by Kosaka Laboratory Ltd.). The Rz and the Sm are each the average of values measured at six sites of the charging roller selected at random. It is to be noted that a cutoff value is 0.8 mm and an evaluation length is 8 mm.

(1-1) Substrate

The substrate is preferably an electroconductive substrate and has a function of supporting an elastic layer and the like provided on the electroconductive substrate.

Examples of the material for the electroconductive substrate include metals such as iron, copper, stainless steel, aluminum, and nickel, and an alloy thereof. Further, in order to impart scratch resistance to the surfaces of those materials, the surfaces of those materials may be subjected to plating or the like to such a degree that conductivity is not impaired. Further, a substrate obtained by covering the surface of a resin substrate with a metal or the like to impart conductivity to the surface or a substrate formed of an electroconductive resin composition can also be used as the electroconductive substrate.

(1-2) Elastic Layer

The elastic layer is preferably an electroconductive elastic layer, and contains a polar rubber and calcium carbonate hollow particles.

It is to be noted that the elastic layer preferably has a volume resistivity measured under a 23° C./50% RH environment of $10^2$ Ω·cm or more and $10^{10}$ Ω·cm or less, and an electroconductive filler or ion conducting agent described later can be appropriately added to the polar rubber for adjusting the volume resistivity.

(1-2-1) Rubber Having a Polar Group (Polar Rubber)

A known polar rubber can be used as the polar rubber. For example, an acrylonitrile-butadiene rubber (NBR), an epichlorohydrin rubber, a urethane rubber, a butyl rubber (IIR), and a fluorine rubber can be used. It is to be noted that the polar group of the polar rubber is, for example, a CN group in the case of the acrylonitrile-butadiene rubber and a Cl group in the case of the epichlorohydrin rubber.

(1-2-2) Hollow Particles Each Having a Shell Containing Crystals of Calcium Carbonate (Calcium Carbonate Hollow Particles)

The calcium carbonate hollow particles are characterized by containing calcium carbonate crystals in the shells of the hollow particles.

Another crystal may be mixed in the shell of the hollow particle. However, when the amount of the calcium carbonate crystals is small, the effect is not sufficient. Therefore, the content of the calcium carbonate crystals is preferably 80 mass % or more, more preferably 95 mass % or more of the entire crystal phase. The content of the calcium carbonate crystals can be roughly calculated from a peak intensity ratio of the maximum peaks of the respective crystal structures by X-ray diffraction measurement described later.

In the calcium carbonate crystals, three kinds of crystal structures, i.e., calcite, vaterite, and aragonite are present. Of those, the calcite crystal structure is chemically stable, and further facilitates the formation of hollow particles. Therefore, it is preferred to use a calcium carbonate crystal having a calcite crystal structure in the present invention.

In addition, it is preferred that the calcium carbonate crystal be highly crystalline. The use of the highly crystalline calcium carbonate reduces the interaction between the polar group in the polar rubber in the elastic layer and the surface of the calcium carbonate crystal, and hence a sufficient increasing effect on tan δ and a sufficient suppressing effect on the vibration are obtained. The crystallinity can be evaluated through use of a half width of the maximum peak by powder X-ray diffraction, and the crystallinity is higher as the half width is smaller. In the present invention, the crystallinity is evaluated based on the half width on a (104) crystal plane appearing as the maximum peak among the X-ray diffraction peaks of the calcite crystal structure. In the present invention, the half width of the X-ray diffraction peak of the (104) crystal plane in the calcite crystal structure is preferably 0.25° or less, more preferably 0.22° or less. On the other hand, the lower limit value of the half width is 0.05° in consideration of the measurement limit of the measurement device. It is to be noted that a method of measuring a half width is described later.

The form of a shell containing calcium carbonate crystals is preferably a porous shell including a great number of connection holes. When the shell is porous, air in the shell can move in the connection holes during the deformation of the shell. Consequently, the shell can be deformed more largely by preventing an increase in internal pressure in the shell, and hence the increasing effect on tan δ and the suppressing effect on the vibration are enhanced.

As a hollow shape of the calcium carbonate hollow particles, there are given a single-hollow shape and a multi-hollow shape. A single-hollow shape is preferred from the viewpoint of deformability of a shell.

As the hollowness of the calcium carbonate hollow particles is higher, the suppressing effect on the vibration is enhanced. However, when the thickness of a shell becomes remarkably small, problems such as the damage of the shell may occur. Therefore, the hollowness of the calcium carbonate hollow particles is preferably 20 volume % or more and 60 volume % or less with respect to the volume of the calcium carbonate hollow particles.

The addition amount of the calcium carbonate hollow particles is preferably 20 parts by mass or more and 100 parts by mass or less, particularly preferably 30 parts by mass or more and 60 parts by mass or less with respect to 100 parts by mass of the polar rubber in the elastic layer from the viewpoint of the further exhibition of the suppressing effect on the vibration.

Further, as a guideline of the volume average particle diameter of the calcium carbonate hollow particles, the volume average particle diameter is preferably 1.0 μm or more and 20.0 μm or less, particularly preferably 3.0 μm or more and 10.0 μm or less.

It is to be noted that, as a method of producing the calcium carbonate hollow particles, there are given the following production methods 1 to 3.

<Production Method 1>

Hollow particles formed of the calcium carbonate crystals can be produced by: blowing air bubbles of gases containing a carbon dioxide gas as a main component into an aqueous solution in which a calcium salt and ammonia are dissolved; and causing calcium ions and carbonate ions to react with each other at an interface between the air bubbles of the carbon dioxide gas and the aqueous solution, thereby precipitating calcium carbonate crystals. A specific production method is described below.

First, an aqueous solution in which a calcium salt and ammonia are dissolved (hereinafter simply referred to as "aqueous solution") is prepared. Any calcium salt can be used as the calcium salt as long as it is soluble in water. Examples of the water-soluble calcium salt include calcium chloride, calcium hydroxide, calcium nitrate, and calcium bromide, and in particular, calcium chloride is preferably used. Any of an ammonia gas and ammonia water can be used as ammonia. A procedure involving adding ammonia water is preferably used from the viewpoint that the procedure is capable of adjusting the concentration with ease.

After that, air bubbles with a predetermined size of gases containing a carbon dioxide gas as a main component (hereinafter simply referred to as "air bubbles") are blown into the aqueous solution, whereby carbonate ions ($CO_3^{2-}$) derived from carbon dioxide in the air bubbles and calcium ions ($Ca^{2+}$) present in the aqueous solution are caused to react at an interface between the air bubbles and the aqueous solution. Calcium carbonate ($CaCO_3$) crystals thus generated grow at the interface between the air bubbles and the aqueous solution, and the adjacent calcium carbonate crystals are bonded to each other to form a shell formed of the calcium carbonate crystals. The air bubbles are blown into the aqueous solution for a predetermined period of time, and thereafter, a precipitate in the aqueous solution is collected with a filter and dried, whereby calcium carbonate hollow particles each formed of a porous shell containing fine calcium carbonate crystals can be obtained.

It is to be noted that the hollowness of the hollow particles can be controlled by the calcium concentration of the aqueous solution. In the case where the calcium concentration is high, the formation of a shell by the precipitation of calcium carbonate occurs rapidly, and hence the shell becomes thick and the hollowness becomes small. In contrast, in the case where the calcium concentration is low, the precipitation of calcium carbonate does not occur efficiently, and hence the shell becomes thin and the hollowness becomes large. From the viewpoint of efficient shell formation, it is preferred that the concentration of a calcium salt in the aqueous solution be 0.05 mol/L or more and 5 mol/L or less.

When the pH of the aqueous solution is too low or too high, calcium carbonate fine crystals are not precipitated efficiently at the interface between the air bubbles and the aqueous solution, and hollow particles may not be generated. Therefore, it is preferred that the pH of the aqueous solution be in the range of 8 or more and 13 or less.

Further, when the air bubbles to be blown into the aqueous solution are too large, the reaction between carbonate ions and calcium ions at the interface between the air bubbles and the aqueous solution does not proceed efficiently, and hollow particles may not be generated. Thus, the sizes of the air bubbles to be blown into the aqueous solution are 100 μm or less, preferably 50 μm or less, more preferably 20 μm or less. It is to be noted that the particle diameters of the hollow particles can be controlled by the sizes of the air bubbles to be blown into the aqueous solution. As a procedure for blowing the air bubbles into the aqueous solution, there is given a procedure involving setting a porous body equipped with a gas introduction tube in a reaction vessel containing an aqueous solution and flowing a carbon dioxide gas to the gas introduction tube at a predetermined flow rate.

The crystal structure of each calcium carbonate crystal to be precipitated and grown can be controlled by regulating the temperature of the aqueous solution at a time when a carbon dioxide gas is blown thereto. For example, calcium carbonate hollow particles having a single calcite crystal structure can be obtained, for example, by setting the temperature of the aqueous solution to 30° C. or less.

<Production Method 2>

Calcium carbonate hollow particles can be produced by: causing calcium carbonate primary particles to adhere to oil droplet surfaces; precipitating and growing secondary particles, through the addition of a component for generating secondary particles to the resultant, to connect the primary particles to each other; and thereafter removing oil. Hereinafter, a specific production method is described.

First, calcium carbonate particles (primary particles) and kerosene (oil) are added to a calcium chloride solution, and the resultant is stirred at a high speed of 2,000 rpm to cover the oil droplet surfaces with the calcium carbonate particles. Calcium carbonate particles to be used as primary particles are not particularly limited, and known particles can be used.

After that, the pH of the resultant is adjusted to a predetermined pH by adding a calcium chloride solution as a secondary particle generation undiluted solution to the resultant and adding a sodium hydroxide solution gradually to the resultant. After that, the resultant solution is stirred at a low speed of about 50 rpm for 24 hours or more and 48 hours or less.

Thus, carbonate ions in the carbon dioxide gas in air dissolved in the solution and calcium ions in the solution react with each other, whereby calcium carbonate crystals are precipitated between calcium carbonate primary particles covering the oil droplets to connect the primary particles to each other. As a result, secondary particles are generated. It is to be noted that glycerin be added as a thickener because suppressing effects on connection between the oil droplets covered with the calcium carbonate primary particles and on the peeling of the calcium carbonate primary particles from the oil droplet surfaces can be expected.

After that, the resultant solution is separated into a supernatant and a sediment by a procedure such as centrifugation, and the obtained sediment is soaked in ethanol. Consequently, oil is eluted into ethanol from gaps between the calcium carbonate particles. Calcium carbonate hollow particles can be obtained by drying the sediment.

It is to be noted that, when the pH is too low or too high, calcium carbonate crystals are not precipitated efficiently from the secondary particle generation undiluted solution, and hollow particles may not be generated. Therefore, it is preferred that the pH be in the range of 8 or more and 13 or less.

<Production Method 3>

Calcium carbonate hollow particles can be produced by spraying a water-soluble calcium salt solution into a reaction vessel heated to a temperature of 300° C. or more and 1,500° C. or less together with a carbon dioxide gas, thereby causing the calcium salt to react with the carbon dioxide gas. A specific production method is described below.

Figure 5:
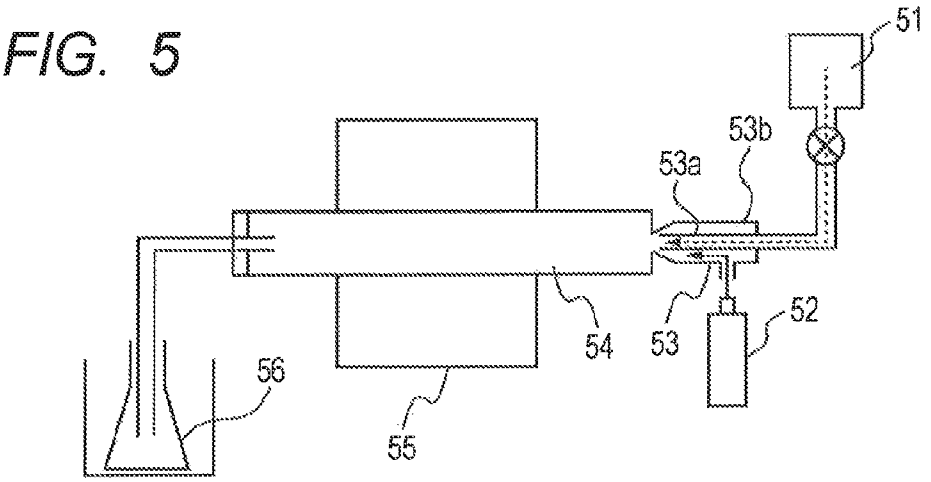
FIG. 5 is a schematic view of a production device of hollow particles each having a shell containing crystals of calcium carbonate in a production method 3.

FIG. 5 is a schematic view of a production device of calcium carbonate hollow particles in the production method 3. First, a water-soluble calcium salt to be a raw material is dissolved in water to obtain an aqueous calcium salt solution, and the aqueous calcium salt solution is supplied to an aqueous calcium salt solution tank 51. The water-soluble calcium salt to be a raw material is not particularly limited, and known materials such as calcium nitrate, calcium chloride, and calcium bromide can be used. It is to be noted that it is preferred to add ammonia together with the water-soluble calcium salt. The addition of ammonia accelerates the dissolution of a carbon dioxide gas into a reaction solution, and hence the transition from the water-soluble calcium salt to calcium carbonate can be effected efficiently.

The carbon dioxide gas to be used as a raw material may be used alone or may be diluted with an inert gas such as nitrogen, further with air. The concentration of the carbon dioxide gas is preferably 20% or more, more preferably 50% or more from the viewpoint of generation efficiency of calcium carbonate.

The aqueous calcium salt solution can be caused to react with the carbon dioxide gas through use of a known double-tube ejection apparatus as illustrated in FIG. 5. The calcium salt solution is passed through an inner tube 53*a* of a reaction raw material ejection tube 53. Then, simultaneously, the carbon dioxide gas is passed between the inner tube 53*a* and an outer tube 53*b* from a carbon dioxide gas cylinder 52 under the application of pressure to eject the carbon dioxide gas from an ejection port, and the aqueous calcium salt solution and the carbon dioxide gas are both ejected into a reaction vessel 54. Thus, calcium carbonate is precipitated by the reaction between the calcium salt and the carbon dioxide gas, and moisture in the aqueous calcium salt solution is evaporated in the reaction vessel 54, whereby calcium carbonate hollow particles can be produced.

The forms of the particles are influenced by the concentration and reaction temperature of the aqueous calcium salt solution. Therefore, when the concentration of the solution is too low, a shell is not formed sufficiently, and hence the particles do not become hollow particles. When the concentration is too high, a core portion is not evaporated sufficiently, and hence the particles become sponge-like (multi-hollow) particles.

Further, the crystal structure of a calcium carbonate crystal is changed depending on the temperature of the reaction vessel. The calcium carbonate crystal has a calcite crystal structure when the temperature is 400° C. or more and 1,500° C. or less and has a crystal structure (mixed crystal structure) in which a calcite crystal structure and a vaterite crystal structure are mixed when the temperature is less than 400° C.

In any of the production methods 1 to 3, calcium carbonate hollow particles can be produced. However, the calcium carbonate hollow particles produced by the production method 1 are preferred because they have a high suppressing effect on vibration by virtue of their high crystallinity and ability to form a porous shell.

In the case of the production method 2, a crystal direction remarkably varies between the calcium carbonate primary particles and the calcium carbonate secondary particles precipitated in a solution. Therefore, the contribution as a grain boundary increases, and the crystallinity of a shell is degraded compared to that of the case of the production method 1.

In the case of the production method 3, calcium carbonate crystals are rapidly generated in the reaction vessel and contain a great number of defects, and hence the crystallinity of a shell is degraded compared to that of the case of the production method 1.

(Conducting Agent)

It is preferred that the elastic layer have a volume resistivity measured under a 23° C./50% RH environment of $10^2$ Ω·cm or more and $10^{10}$ Ω·cm or less, and the volume resistivity can be adjusted by appropriately adding a conducting agent such as an electroconductive filler or an ion conducting agent to a polar rubber.

Examples of the electroconductive filler include metal oxide-based electroconductive fine particles, metal-based electroconductive fine particles, carbon black, and carbon-based electroconductive fine particles. One kind of the electroconductive fillers can be used alone, or two or more kinds thereof can be used in combination.

Examples of the metal oxide-based electroconductive fine particles include zinc oxide, tin oxide, indium oxide, titanium oxide, and iron oxide. Some of the metal oxide-based electroconductive fine particles exhibit sufficient conductivity alone, but some of them do not exhibit sufficient conductivity alone. In order to impart sufficient conductivity to the fine particles, that is, in order to set the volume resistivity of the fine particles to less than $1\times10^{10}$ Ω·cm, a dopant may be added to those fine particles. In general, it is considered that excess electrons are generated in the metal oxide-based electroconductive fine particles owing to the presence of lattice defects, which exhibit conductivity, and the addition of a dopant accelerates the formation of lattice defects, whereby sufficient conductivity can be obtained. For example, aluminum is used as a dopant of zinc oxide; antimony as a dopant of tin oxide; tin as a dopant of indium oxide, etc. Further, in the case of obtaining conductivity regarding titanium oxide, there is given titanium oxide covered with electroconductive tin oxide.

Examples of the metal-based electroconductive fine particles include fine particles of silver, copper, nickel, and zinc.

Examples of the carbon black include acetylene black, furnace black, and channel black.

Examples of the carbon-based electroconductive fine particles may include graphite, carbon fibers, activated carbon, and charcoal.

Of those, in particular, the metal oxide-based electroconductive fine particles are preferably used as the electroconductive filler. The metal oxide-based electroconductive fine particles have an advantage of being adjusted to a desired resistance with ease as well as an advantage of having satisfactory dispersibility with respect to a binding material such as a resin. Of those, in particular, tin oxide or titanium oxide is more preferably used.

Further, the volume average particle diameter of the electroconductive filler is preferably 0.001 μm or more and 2 μm or less, more preferably 0.005 μm or more and 0.5 μm or less. An elastic layer having a desired resistance and less uneven resistance can be easily obtained through use of an electroconductive filler having a volume average particle diameter in the above-mentioned range. It is to be noted that a method of measuring the volume average particle diameter is described later.

Examples of the ion conducting agent include the following agents: inorganic ionic substances such as lithium perchlorate, sodium perchlorate, and calcium perchlorate; cationic surfactants such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethylammonium ethosulfate; amphoteric surfactants such as lauryl betaine, stearyl betaine, and a dimethylalkyllauryl betaine; quaternary ammonium salts such as tetraethylammonium perchlorate, tetrabutylammonium perchlorate, and trimethyloctadecylammonium perchlorate; and organic acid lithium salts such as lithium trifluoromethanesulfonate. One kind of those agents may be used alone, or two or more kinds thereof may be used in combination.

(Other)

The elastic layer may contain a known filler in such a range that the effect of the hollow calcium carbonate particles in the present invention is not impaired. Examples of the filler can include particles of zinc oxide, indium oxide, titanium oxides (such as titanium dioxide and titanium monoxide), iron oxide, silica, alumina, magnesium oxide, zirconium oxide, strontium titanate, calcium titanate, magnesium titanate, barium titanate, calcium zirconate, barium sulfate, molybdenum disulfide, calcium carbonate, magnesium carbonate, dolomite, talc, kaolin clay, mica, aluminum hydroxide, magnesium hydroxide, zeolite, wollastonite, diatomaceous earth, glass beads, bentonite, montmorillonite, hollow glass spheres, an organic metal compound, and an organic metal salt. In addition, iron oxides such as ferrite, magnetite, and hematite, activated carbon, and the like can also be used. Such filler may be subjected to, for example, a surface treatment, modification, the introduction of a functional group or a molecular chain, or coating. The filler is more preferably subjected to a surface treatment in order that the dispersibility of the filler may be improved.

As a surface treatment agent for the filler, the following agents are usable: an organic silicon compound such as an alkoxysilane, a fluoroalkylsilane, or a polysiloxane; various coupling agents such as silane-based, titanate-based, aluminate-based, and zirconate-based agents; and an oligomer or polymer compound. One kind of those agents may be used alone, or two or more kinds thereof may be used in combination. Further, in addition to the treatment, a surface treatment with a fatty acid or a fatty acid metal salt can be given. A saturated or unsaturated fatty acid may be used as the fatty acid, and a fatty acid having 12 to 22 carbon atoms is preferred. A salt of a saturated or unsaturated fatty acid and a metal can be used as the fatty acid metal salt. Specific examples thereof may include a salt of a fatty acid having 12 to 18 carbon atoms and a metal such as an alkali earth metal, e.g., magnesium, calcium, strontium, or barium, an alkali metal, e.g., lithium, sodium, or potassium, zinc, aluminum, copper, iron, lead, or tin.

It is preferred that the surface treatment agent be used in an amount of 0.01 part by mass or more and 15.0 parts by mass or less with respect to 100 parts by mass of the filler. When the amount is in the above-mentioned range, the surface treatment agent can impart sufficient dispersibility to the filler. The amount is more preferably 0.02 part by mass or more and 12.5 parts by mass or less, still more preferably 0.03 part by mass or more and 10.0 parts by mass or less.

Further, in order to adjust the hardness and the like of the elastic layer, additives such as softening oil and a plasticizer may be added. The compounding amount of the plasticizer and the like is preferably 1 part by mass or more and 30 parts by mass or less, more preferably 3 parts by mass or more and 20 parts by mass or less with respect to 100 parts by mass of the polar rubber. A high-molecular plasticizer is more preferably used as the plasticizer. A weight average molecular weight Mw of a high-molecular plasticizer is preferably 2,000 or more, more preferably 4,000 or more.

Further, the elastic layer may appropriately contain materials imparting various functions. Examples thereof include an antioxidant and a filling agent.

The elastic layer may be subjected to a surface treatment. Examples of the surface treatment include a surface processing treatment using UV-rays or electron beams and a surface modification treatment involving causing a compound or the like to adhere to the surface of the elastic layer and/or impregnating the surface of the elastic layer with a compound or the like.

(1-3) Surface Layer

A charging roller may form a surface layer on an elastic layer as needed. It is preferred that the surface layer be an electroconductive surface layer. It is preferred to use a resin as a binder to be used for the surface layer from the viewpoint that the resin does not contaminate a photosensitive member or other members and has high releasability.

A known binder resin can be adopted as the binder resin to be used for the surface layer. For example, resins such as a thermosetting resin and a thermoplastic resin can be used. Of those, for example, the following resins are additionally preferred: a fluororesin, a polyamide resin, an acrylic resin, a polyurethane resin, an acrylic urethane resin, a silicone resin, and a butyral resin.

One kind of those resins may be used alone, or two or more kinds thereof may be mixed and used. In addition, a copolymer obtained by copolymerizing monomers that are raw materials for those resins may be used.

The volume resistivity of the surface layer is more preferably set to $1\times10^{3}$ Ω·cm or more and $1\times10^{15}$ Ω·cm or less under a 23° C./50% RH environment in order that the electric resistance of the charging member may be set to the above-mentioned value.

The volume resistivity of the surface layer can be adjusted with a conducting agent such as an electroconductive filler or an ion conducting agent, and those which are used in the elastic layer can each be used as the conducting agent.

When carbon black is used as an electroconductive filler, the carbon black is more preferably used as composite electroconductive fine particles obtained by coating metal oxide-based fine particles with the carbon black. It tends to be difficult to cause the carbon black to exist uniformly in the binder because the carbon black forms a structure. When the carbon black is used as composite electroconductive fine particles obtained by coating metal oxide-based electroconductive fine particles with the carbon black, the electroconductive filler can be caused to exist uniformly in the binder resin, and hence the volume resistivity is controlled with additional ease.

Examples of the metal oxide to be used for that purpose include a metal oxide and a composite metal oxide.

Specific examples of the metal oxide can include zinc oxide, tin oxide, indium oxide, titanium oxides (such as titanium dioxide and titanium monoxide), iron oxide, silica, alumina, magnesium oxide, and zirconium oxide.

In addition, examples of the composite metal oxide can include strontium titanate, calcium titanate, magnesium titanate, barium titanate, and calcium zirconate.

Metal oxide-based electroconductive fine particles subjected to a surface treatment can also be used. Organic silicon compounds such as an alkoxysilane, a fluoroalkylsilane, and a polysiloxane, various kinds of silane-based, titanate-based, aluminate-based, and zirconate-based coupling agents, and oligomer or polymer compounds can each be used as the surface treatment agent. One kind of those agents may be used alone, or two or more kinds thereof may be used.

The addition amount of those electroconductive agents to be added to the surface layer falls within the range of preferably 2 parts by mass or more and 80 parts by mass or less, more preferably 20 parts by mass or more and 60 parts by mass or less with respect to 100 parts by mass of the binder resin.

Any other particles may be contained in the surface layer in such a range that the effect of the present invention is not impaired. Examples of the particles may include particles of zinc oxide, tin oxide, indium oxide, titanium oxides (such as titanium dioxide and titanium monoxide), iron oxide, silica, alumina, magnesium oxide, zirconium oxide, strontium titanate, calcium titanate, magnesium titanate, barium titanate, calcium zirconate, barium sulfate, molybdenum disulfide, calcium carbonate, magnesium carbonate, dolomite, talc, kaolin clay, mica, aluminum hydroxide, magnesium hydroxide, zeolite, wollastonite, diatomaceous earth, glass beads, bentonite, montmorillonite, an organic metal compound, and an organic metal salt. In addition, for example, the following may also be used: iron oxides such as ferrite, magnetite, and hematite, and activated carbon.

Examples thereof further include particles formed of a polymer compound. Examples thereof may include: resins such as a polyamide resin, a silicone resin, a fluororesin, a (meth)acrylic resin, a styrene resin, a phenol resin, a polyester resin, a melamine resin, a urethane resin, an olefin resin, and an epoxy resin, and copolymers, modified products, and derivatives thereof; and thermoplastic elastomers such as a polyolefin-based thermoplastic elastomer, a urethane-based thermoplastic elastomer, a polystyrene-based thermoplastic resin elastomer, a fluororubber-based thermoplastic elastomer, a polyester-based thermoplastic elastomer, a polyamide-based thermoplastic elastomer, a polybutadiene-based thermoplastic elastomer, an ethylene vinyl acetate-based thermoplastic elastomer, a polyvinyl chloride-based thermoplastic elastomer, and a chlorinated polyethylene-based thermoplastic elastomer.

One kind of those particles may be used alone, or two or more kinds thereof may be used in combination. Particles subjected to a surface treatment, modification, introduction of a functional group or a molecular chain, coating, or the like may be used. In order to enhance the dispersibility of the particles, it is more preferred that the particles be subjected to a surface treatment.

In order to enhance the releasability of the surface, the surface layer may contain the releasing agent. When the surface layer contains a releasing agent, the dirt can be prevented from adhering to the surface of a charging member and the durability of the charging member can be enhanced. In the case where the releasing agent is a liquid, the releasing agent also serves as a leveling agent during formation of the surface layer.

For example, those which have low surface energy and those which have sliding properties can each be used as such releasing agent, and a solid or liquid releasing agent can be used. Specifically, there are given metal oxides such as graphite, graphite fluoride, molybdenum disulfide, tungsten disulfide, boron nitride, and lead monoxide. Further, a compound containing, in molecules, oily or solid (releasable resin or powder thereof, polymer in which a releasable moiety is partially introduced) silicon or fluorine, wax, a higher fatty acid, or a salt or ester thereof, and other derivatives can also be used.

It is preferred that the surface layer have a thickness of 0.1 μm or more and 100 μm or less. The thickness of the surface layer is more preferably 1 μm or more and 50 μm or less.

It is to be noted that the film thickness of the surface layer can be measured by cutting out a roller cross-section with a sharp blade and observing the roller cross-section with an optical microscope or an electron microscope.

The surface layer may be subjected to a surface treatment. Examples of the surface treatment include a surface processing treatment using UV-rays or electron beams and a surface modification treatment involving causing a compound or the like to adhere to the surface of the surface layer and/or impregnating the surface of the surface layer with a compound or the like.

The surface layer can be formed by a coating method such as electrostatic spray coating or dip coating. Alternatively, the surface layer can also be formed by attaching a sheet-shaped or tube-shaped layer formed to a predetermined film thickness in advance to a particle or covering a particle with the sheet-shaped or tube-shaped layer. Alternatively, a method involving curing a material to a predetermined shape in a mold and forming the material can also be used. Of those, it is preferred that a coating be applied to a particle to form a coating film thereon by a coating method.

When the layer is formed by the coating method, a solvent to be used in the coating solution has only to be a solvent capable of dissolving the binder resin. Specific examples thereof include: alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethyl sulfoxide; ethers such as tetrahydrofuran, dioxane, and ethylene glycol monomethyl ether; esters such as methyl acetate and ethyl acetate; and aromatic compounds such as xylene, ligroin, chlorobenzene, and dichlorobenzene.

Known solution dispersion means such as a ball mill, a sand mill, a paint shaker, a dyno-mill, or a pearl mill can be used as a method of dispersing the binder resin, the conducting agent, and the like in the coating solution.

(2) Electrophotographic Apparatus

Figure 4A:
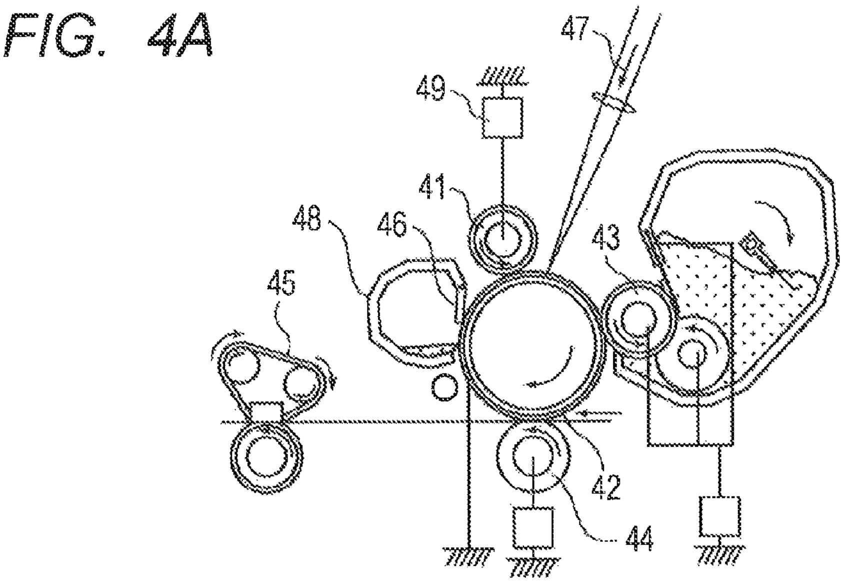
FIG. 4A is a schematic view illustrating an exemplary cross-section of an electrophotographic apparatus of the present invention.

FIG. 4A illustrates an example of the schematic configuration of an electrophotographic apparatus provided with the charging member.

The electrophotographic apparatus is formed of, for example, an eletrophotographic photosensitive member, a charging apparatus for charging the eletrophotographic photosensitive member, a latent image-forming apparatus for performing exposure, a developing apparatus for developing a latent image into a toner image, a transferring apparatus for transferring the toner image onto a transfer material, a cleaning apparatus for recovering transfer residual toner on the eletrophotographic photosensitive member, and a fixing apparatus for fixing the toner image.

An electrophotographic photosensitive member 42 is of a rotating drum type having a photosensitive layer on a substrate. The electrophotographic photosensitive member is rotationally driven in the direction indicated by an arrow at a predetermined circumferential speed (process speed).

The charging apparatus has a contact-type charging roller 41 placed so as to be in contact with the electrophotographic photosensitive member 42 by being brought into abutment with the member at a predetermined pressing force. The charging roller 41 is of a dependent-rotating type that rotates following the rotation of the eletrophotographic photosensitive member 42, and the roller charges the eletrophotographic photosensitive member to a predetermined potential by applying a predetermined DC voltage from a power supply 49 for charging.

An exposing apparatus such as a laser beam scanner is used as a latent image-forming apparatus (not shown) for forming an electrostatic latent image on the electrophotographic photosensitive member 42. When the uniformly charged eletrophotographic photosensitive member 42 is irradiated with exposure light 47 corresponding to image information, an electrostatic latent image is formed.

The developing apparatus has a developing sleeve or developing roller 43 placed so as to be close to, or in contact with, the electrophotographic photosensitive member 42. The electrostatic latent image is developed to form a toner image with toner, which has been subjected to an electrostatic treatment so as to have the same polarity as the charged polarity of the eletrophotographic photosensitive member, by reversal development.

The transferring apparatus has a contact-type transfer roller 44. The apparatus transfers the toner image from the eletrophotographic photosensitive member onto a transfer material such as plain paper (the transfer material is conveyed by a sheet-feeding system having a conveying member).

The cleaning apparatus has a blade-type cleaning member 46 and a recovery container 48, and mechanically scrapes transfer residual toner remaining on the eletrophotographic photosensitive member 42 after the transfer to recover the toner.

Here, adopting a simultaneous-with-development cleaning mode according to which the transfer residual toner is recovered in the developing apparatus can eliminate the cleaning apparatus.

A fixing apparatus roller 45 is formed of a heated roll or the like, and fixes the transferred toner image onto the transfer material and discharges the resultant to the outside of the apparatus.

(3) Process Cartridge

Figure 4B:
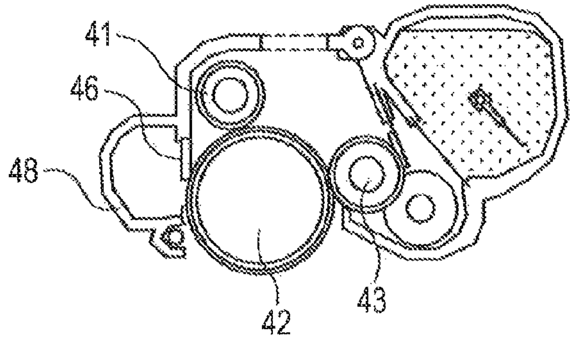
FIG. 4B is a schematic view illustrating an exemplary cross-section of a process cartridge of the present invention.

A process cartridge obtained by integrating, for example, an eletrophotographic photosensitive member, a charging apparatus, a developing apparatus, and a cleaning apparatus, and designed so as to be detachable from an electrophotographic apparatus can also be used. FIG. 4B illustrates a schematic view thereof.

That is, the process cartridge is as described below. A charging member is integrated with at least a body to be charged, the process cartridge is configured to be detachable from the main body of the electrophotographic apparatus, and the charging member is the charging member described above.

In addition, an electrophotographic apparatus has at least a process cartridge, a latent image-forming apparatus, and a developing apparatus, and the process cartridge is the process cartridge described above.

EXAMPLES

Hereinafter, the present invention is described in more detail by way of specific examples.

Production Example 1

Production of Calcium Carbonate Hollow Particles 1

15 mL of 25% ammonia water were added to and mixed in 500 mL of a 0.3 mol/L aqueous calcium chloride solution. After that, an appropriate amount of hydrochloric acid was added dropwise to the resultant mixture to prepare an aqueous solution having a pH of 9.8.

Then, the obtained aqueous solution was kept at a temperature of 25° C., and air bubbles of a carbon gas dioxide were blown into the aqueous solution while the solution was stirred for 10 minutes. The carbon dioxide gas was blown into the aqueous solution by supplying the carbon dioxide gas to a wooden filter set in a reaction vessel through a gas introduction tube. The supply amount (flow rate) of the carbon dioxide gas was set to 3 L/min, and the sizes of the carbon dioxide air bubbles blown into the aqueous solution were 5 μm.

Then, a precipitate was collected with a filter and dried to obtain calcium carbonate hollow particles 1.

The obtained calcium carbonate hollow particles 1 were measured for the crystal structure and crystallinity of a shell, a hollowness, and a volume average particle diameter. The respective measurement methods are described below.

Figure 6:
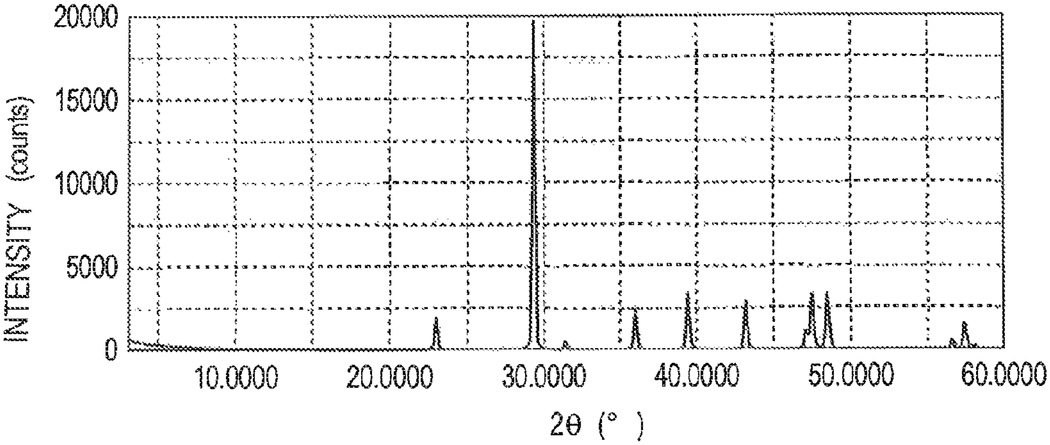
FIG. 6 is an X-ray diffraction spectrum of calcium carbonate hollow particles 1 obtained in a production example 1.

FIG. 6 is a graph showing an X-ray diffraction spectrum of the measured calcium carbonate hollow particles 1. The ordinate indicates detected X-ray intensity, and the abscissa indicates a diffraction angle 2θ.

The crystal structure of the calcium carbonate hollow particles 1 is a single calcite crystal structure, and a half width of an X-ray diffraction peak of a (104) crystal plane in the calcite crystal structure was 0.204°. Further, the hollowness was 12 volume %, and the volume average particle diameter was 3.4 μm. Further, it was confirmed from a cross-section image of the calcium carbonate hollow particles 1 obtained for measuring a hollowness that the calcium carbonate hollow particles 1 each had a porous shell.

[Identification of Crystal Structure]

An X-ray diffraction peak was obtained by performing 2θ/θ scanning through use of an X-ray diffractometer, and a crystal structure was identified.

The X-ray diffraction measurement was performed through use of an X-ray diffractometer (trade name: "RINT-TTRII," manufactured by Rigaku Corporation) for a sample filled into a sample holder made of aluminum so that a measurement surface was aligned smoothly. It is to be noted that the X-ray diffraction measurement was performed through use of a CuKα-beam with an X-ray output of 50 kV and 300 mA by a parallel beam method under the conditions of a divergence vertical limit slit of 10.0 mm, a scanning range of a diffraction angle 2θ of 3 to 60°, and a step width of 0.02°.

[Crystallinity of Calcite Crystal Structure]

A calcite crystal structure was evaluated for crystallinity. The crystallinity was evaluated by a half width of an X-ray diffraction peak of a (104) crystal plane in a calcite crystal structure.

The X-ray diffraction measurement was performed in the same way as in the identification of a crystal structure except for setting 2θ to 25 to 35° and a step width to 0.005°. It is to be noted that an X-ray diffraction peak of a (104) crystal plane in a calcite crystal structure is detected in a region with a diffraction angle 2θ of 29 to 30°.

[Hollowness]

Only primary particles excluding secondarily coagulated particles were cut out with a focused ion beam (trade name: "FB-2000C," manufactured by Hitachi Ltd.) by 20 nm, and cross-section images thereof were photographed. Then, the images photographed from the same particle were combined at an interval of 20 nm, and a three-dimensional particle shape was calculated. The ratio of the total volume of a void to the total volume of the hollow particle was calculated from the calculated three-dimensional shape. This operation was performed for any 10 particles, and an average value thereof was defined as a hollowness of the particles.

[Volume Average Particle Diameter]

The volume average particle diameter of each of the calcium carbonate hollow particle and the electroconductive filler in the present invention was measured by the following method. That is, the volume average particle diameter was measured with a Coulter-LS-230 particle size analyzer (trade name, manufactured by Beckman Coulter, Inc.) serving as a laser diffraction particle size analyzer. An aqueous module was used for measurement, and pure water was used as a measurement solvent. The inside of a measurement system of the particle size analyzer was washed with pure water for about 5 minutes, and 10 mg to 25 mg of sodium sulfite were added to the measurement system as a defoaming agent, followed by the execution of a background function. Next, 3 to 4 drops of a surfactant were added to 50 mL of pure water, and further 1 mg to 25 mg of a measurement sample were added thereto. An aqueous solution in which the sample was suspended was subjected to a dispersion treatment by an ultrasonic disperser for 1 to 3 minutes to prepare a sample liquid under test. The sample liquid under test was gradually added into the measurement system of the measurement device, and the concentration of the sample liquid under test in the measurement system was adjusted so that PIDS on a screen of the device became 45% or more and 55% or less. Under this condition, measurement was performed. A volume average particle diameter was calculated from the obtained volume distribution.

Production Example 2

Production of Calcium Carbonate Hollow Particles 2

Calcium carbonate hollow particles 2 were obtained in the same way as in the production example 1 except for changing the concentration of the aqueous calcium chloride solution to 0.1 mol/L in the production example 1.

The same evaluation as that of the production example 1 was performed, and it was found that the crystal structure of the calcium carbonate hollow particles 2 was a single calcite crystal structure. Table 5 shows the results. Further, it was confirmed from a cross-section image of the calcium carbonate hollow particles 2 obtained for measuring a hollowness that the calcium carbonate hollow particles 2 each had a porous shell.

Production Example 3

Production of Calcium Carbonate Hollow Particles 3

Calcium carbonate hollow particles 3 were obtained in the same way as in the production example 1 except for changing the concentration of the aqueous calcium chloride solution to 0.05 mol/L in the production example 1.

The same evaluation as that of the production example 1 was performed, and it was found that the crystal structure of the calcium carbonate hollow particles 3 was a single calcite crystal structure. Table 5 shows the results. Further, it was confirmed from a cross-section image of the calcium carbonate hollow particles 3 obtained for measuring a hollowness that the calcium carbonate hollow particles 3 each had a porous shell.

Production Example 4

Production of Calcium Carbonate Hollow Particles 4

Calcium carbonate hollow particles 4 were produced through use of the production device as illustrated in FIG. 5.

A 0.8 mol/L aqueous calcium nitrate salt solution and 1 mol/L aqueous ammonia solution supplied to the aqueous calcium salt solution tank 51 were supplied to the inner tube 53*a* of the reaction raw material ejection tube 53 at a speed of 1.0 mL/min. Simultaneously, a carbon dioxide gas (purity: 99.9%) was supplied from between the inner tube 53*a* and outer tube 53*b* of the reaction raw material ejection tube 53 by the carbon dioxide gas cylinder 52 at a speed of 8.0 L/min. Thus, the aqueous ammonia solution of calcium nitrate and the carbon dioxide gas were sprayed into the reaction vessel 54 kept at a predetermined temperature by an electric furnace 55 to obtain calcium carbonate hollow particles 4 in a collector 56. It is to be noted that the temperature in the reaction vessel 54 was set to 900° C.

The same evaluation as that of the production example 1 was performed, and it was found that the crystal structure of the calcium carbonate hollow particles 4 was a single calcite crystal structure. Table 5 shows the results.

Production Example 5

Production of Calcium Carbonate Hollow Particles 5

Calcium carbonate hollow particles 5 were obtained in the same way as in the production example 4 except for changing the temperature inside the reaction vessel 54 to 650° C. in the production example 4.

The same evaluation as that of the production example 1 was performed, and it was found that the crystal structure of the calcium carbonate hollow particles 5 was a single calcite crystal structure. Table 5 shows the results.

Production Example 6

Production of Calcium Carbonate Hollow Particles 6

Calcium carbonate hollow particles 6 were obtained in the same way as in the production example 4 except for changing the temperature inside the reaction vessel 54 to 400° C. in the production example 4.

The same evaluation as that of the production example 1 was performed, and it was found that the crystal structure of the calcium carbonate hollow particles 6 was a single calcite crystal structure. Table 5 shows the results.

Production Example 7

Production of Calcium Carbonate Hollow Particles 7

Calcium carbonate hollow particles 7 were obtained in the same way as in the production example 4 except for changing the temperature inside the reaction vessel 54 to 200° C. in the production example 4.

The same evaluation as that of the production example 1 was performed, and it was found that the crystal structures of the calcium carbonate hollow particles 7 were a calcite crystal structure and a vaterite crystal structure. A ratio between the respective crystal structures was calculated from an intensity ratio of maximum peaks, and it was found that the ratio between the calcite crystal structure and the vaterite crystal structure was 4:1. Table 5 shows the results.

Production Example 8

Production of Calcium Carbonate Hollow Particles 8

First, 50 g of calcium carbonate solid particles (Nanox #30 (trade name) having a volume average particle diameter of 0.7 μm manufactured by Maruo Calcium Co., Ltd.) were supplied to 500 mL of a 0.1 mol/L calcium chloride solution. Then, 50 mL of oil (kerosene) were added to the resultant, and the mixture was stirred at a high speed of 2,000 rpm, whereby oil droplet surfaces were covered with calcium carbonate particles.

To the solution thus obtained, 700 mL of a 0.1 mol/L aqueous calcium chloride solution and 200 mL of a glycerin (thickener) were added, and thereafter, a 10 mol/L aqueous sodium hydroxide solution was gradually added to the resultant to adjust the pH thereof to 9.0. Then, the resultant was stirred at a low speed of 20 rpm for 20 minutes to accelerate the adhesion of calcium carbonate particles to the oil droplet surfaces.

To the solution, 3 L of a 0.1 mol/L aqueous calcium chloride solution were added. Then, the resultant was stirred at 500 rpm for 10 minutes while a 10 mol/L aqueous sodium hydroxide solution was added to the resultant to adjust the pH thereof to 9.0. After that, the resultant was stirred at 50 rpm for 24 hours to generate a sediment. The sediment obtained by centrifugation was soaked in ethanol, and then ethanol was evaporated by subjecting the solution to a heat treatment at a temperature of 200° C. Thus, calcium carbonate hollow particles 8 were obtained.

The same evaluation as that of the production example 1 was performed, and it was found that the crystal structure of the calcium carbonate hollow particles 8 was a single calcite crystal structure. Table 5 shows the results.

Production Example 9

Production of Calcium Carbonate Hollow Particles 9

Calcium carbonate hollow particles 9 were obtained in the same way as in the production example 8 except for changing the calcium carbonate solid particles into magnesium oxide particles (STARMAG PSF (trade name) having a volume average particle diameter of 1.0 μm manufactured by Konoshima Chemical Co., Ltd.) in the production example 8.

The same evaluation as that of the production example 1 was performed, and two structures, i.e., a calcite crystal structure derived from precipitated calcium carbonate of the calcium carbonate hollow particles 9 and a sodium chloride crystal structure derived from magnesium oxide added as primary particles were confirmed. Those two structures were quantified based on an intensity ratio of maximum peaks, and it was found that the ratio between the calcite crystal structure derived from calcium carbonate and the sodium chloride crystal structure derived from magnesium oxide was 2:3. Table 5 shows the results.

It is to be noted that it was not confirmed from cross-section images of the calcium carbonate hollow particles 4 to 9 obtained for measuring a hollowness that the calcium carbonate hollow particles 4 to 9 each had a porous shell.

Example 1

Electroconductive Substrate

A thermosetting adhesive containing 10 mass % of carbon black in a mixture of liquid NBR and a phenol resin was applied to a substrate made of stainless steel having a diameter of 6 mm and a length of 252.5 mm, and was then dried to obtain an electroconductive substrate.

[Production of Electroconductive Elastic Roller 1]

The electroconductive substrate serving as a center shaft was coaxially covered with an electroconductive rubber composition 1 described later in a cylindrical shape through use of an extrusion molding machine equipped with a crosshead to form an electroconductive elastic layer. The thickness of the electroconductive rubber composition 1 covering the substrate was adjusted to 2.5 mm.

A roller after the extrusion was heated at a temperature of 160° C. for 1 hour with a hot-air oven and ends of the roller were removed so that the remainder had a length of 228 mm.

The outer circumferential surface of the obtained roller was ground through use of a cylindrical grinding machine of a plunge-cutting type to produce an electroconductive elastic roller 1. It is to be noted that the crown amount of the roller (difference between an outer diameter at a central portion and an outer diameter at a position distant from the central portion by 90 mm in a longitudinal direction) was 120 μm.

[Electroconductive Rubber Composition 1]

Materials shown in Table 1 below were added to 100 parts by mass of an epichlorohydrin rubber (EO-EP-AGE ternary compound, EO/EP/AGE=73 mol %/23 mol %/4 mol %), and the mixture was kneaded for 16 minutes with an enclosed mixer adjusted to a temperature of 70° C. It is to be noted that EO, EP, and AGE refer to ethylene oxide, epichlorohydrin, and allylglycidylether, respectively.

TABLE 1

| | |
|---|---|
| Calcium carbonate hollow particles 1 | 20 parts by mass |
| Adipic acid ester (Trade name: POLYCIZER W305ELS, manufactured by Dainippon Ink & Chemicals, Inc.) | 8 parts by mass |
| Zinc stearate (Trade name: SZ-2000, manufactured by Sakai Chemical Industry Co., Ltd.) | 1 part by mass |
| 2-mercaptobenzimidazole (MB) (Antioxidant) | 0.5 part by mass |
| Zinc oxide (Trade name: Zinc white, type 2, manufactured by Sakai Chemical Industry Co., Ltd.) | 2 parts by mass |

TABLE 1-continued

| | |
|---|---|
| Quaternary ammonium salt "Adekacizer LV70" (Trade name, manufactured by ADEKA Corporation) | 2 parts by mass |
| Carbon black "Thermax Floform N990" (Trade name, manufactured by Cancarb Inc. in Canada, Average particle diameter: 270 nm) | 2 parts by mass |

To the kneaded mixture, 0.8 part by mass of sulfur serving as a vulcanizing agent, and 1 part by mass of dibenzothiazyl sulfide (DM) and 0.5 part by mass of tetramethylthiuram monosulfide (TS) serving as vulcanization accelerators were added. Then, the resultant was kneaded for 30 minutes with a twin roll type kneader cooled to a temperature of 20° C. to produce the electroconductive rubber composition 1.

[Production of Electroconductive Resin Coating Solution]

Methyl isobutyl ketone was added to a caprolactone-modified acrylpolyol to prepare a solution so that a solid content became 20 mass %.

Compounds shown in Table 2 below were added to 500 parts by mass of the solution (100 parts by mass of the solid content of the acrylpolyol solution) to prepare a mixed solution.

TABLE 2

| | |
|---|---|
| Carbon black (Trade name: MA-100, manufactured by Mitsubishi Chemical Industries Co., Ltd.) | 45 parts by mass |
| Silicone oil (levelling agent) | 0.08 part by mass |

Then, 160 g of the mixed solution and 200 g of glass beads having an average particle diameter of 0.5 mm serving as a medium were mixed in a 450-mL glass bottle and dispersed for 24 hours through use of a paint shaker disperser.

After the completion of the dispersion, the resultant was cooled at room temperature for 1 hour, and thereafter, 25 parts by mass of a mixture containing hexamethylene diisocyanate (HDI) and isophorone diisocyanate (IPDI) with the ratio between respective butanone oxime blocks being 5:5 were added to the resultant. Further, the resultant mixture was dispersed for 24 hours through use of a paint shaker disperser to obtain an electroconductive resin coating solution.

[Formation of Electroconductive Surface Layer]

The electroconductive resin coating solution was applied to the produced electroconductive elastic roller 1 once by dip coating. The electroconductive resin coating solution was dried with air at room temperature for 30 minutes, and was then subjected to a heat treatment at a temperature of 80° C. for 1 hour and at a temperature of 160° C. for 1 hour through use of a hot air circulation drier to form an electroconductive surface layer. Thus, an electroconductive roller 1 was obtained.

Herein, the dip coating was performed as follows: the soaking time was 9 seconds, and the initial dip coating pull-up speed and the final dip coating pull-up speed were 20 mm/s and 2 mm/s, respectively, with the pull-up speed being changed linearly with respect to time during dip coating.

[Observation of Calcium Carbonate Hollow Particles in Electroconductive Elastic Layer]

Calcium carbonate hollow particles contained in an electroconductive elastic layer of the charging roller 1 were cut out with a focused ion beam (trade name: "FB-2000C," manufactured by Hitachi Ltd.) by 20 nm, and cross-section images thereof were photographed. Any points of the electroconductive elastic layer were cut out with the focused ion beam by 20 nm over 500 μm, and cross-section images thereof were photographed. Then, the images photographed from the same particle were combined at an interval of 20 nm, and a three-dimensional particle shape was calculated. A hollowness was calculated from any 10 particles.

The hollowness in the electroconductive elastic layer was the same as that in a single calcium carbonate hollow particle.

[Measurement of Dynamic Viscoelasticity of Charging Roller]

The charging roller 1 was measured for tan δ through use of a viscoelasticity measurement device (Viscoelasticity spectrometer EXSTAR 6000DMS (trade name) manufactured by EKO Instruments Co., Ltd.). A roller to be measured was produced by cutting out a charging roller central portion of 50 mm from each electroconductive substrate. The measurement conditions were set to be a compression mode, a frequency of 100 Hz, a dynamic distortion of 0.2%, and a temperature of 25° C.

An initial roller and a roller after a durability test in image evaluation described later (hereinafter referred to as "durability roller") were calculated for tan δ, and it was found that the initial roller of the charging roller 1 had a tan δ of 0.10 and the durability roller had a tan δ of 0.09.

[Image Evaluation]

The charging roller 1 was incorporated into an electrophotographic apparatus, and a durability test was performed in a low-temperature and low-humidity environment (temperature: 15° C., humidity: 10% RH). A color laser jet printer (trade name: SateraLBP5400) manufactured by Canon Inc. remodeled to an output speed of 200 mm/sec of a recording medium (A4 vertical output) was used as the electrophotographic apparatus. The resolution of an image was 600 dpi, and the output of primary charging was a DC voltage of −1,100 V. An electrophotographic process cartridge for the above-mentioned printer was used as an electrophotographic process cartridge.

Specifically, a two-sheet intermittent durability test (durability test in which printing was suspended for 3 seconds every time two sheets were printed) was performed by printing an E-character image of a printing density of 1% at a process speed of 200 mm/sec. After 20,000 sheets of images were output, a half-tone image (image in which horizontal lines each having a width of 1 dot were drawn at an interval of 2 dots in a direction perpendicular to the rotation direction of an electrophotographic photoelectric photosensitive member) was output. The obtained images were observed visually, and banding images with lateral streak-like uneven image density caused by uneven charging were determined based on the standards shown in Table 3 below.

TABLE 3

| | |
|---|---|
| Rank 1 | No banding image is formed. |
| Rank 2 | Only a slight banding image is recognized. |
| Rank 3 | There is no problem practically in an image although a banding image is recognized partially at a pitch of a charging roller. |
| Rank 4 | A banding image is conspicuous, and degradation in image quality is recognized. |

Examples 2 to 20

Charging rollers 2 to 20 were produced in the same way as in Example 1 except for changing the kind and addition amount of the calcium carbonate hollow particles to those shown in Table 6 in Example 1. The charging rollers 2 to 20 were evaluated in the same way as in Example 1. Table 6 shows the results.

Example 21

A charging roller 21 was obtained in the same way as in Example 1 except for changing the electroconductive rubber composition 1 to an electroconductive rubber composition 2 shown in Table 4 below in Example 1. The charging roller 21 was evaluated in the same way as in Example 1. Table 6 shows the results.

[Electroconductive Rubber Composition 2]

The following components were added to 100 parts by mass of an acrylonitrile butadiene rubber (trade name: N230SV, manufactured by JSR Corporation), and the mixture was kneaded for 10 minutes with an enclosed mixer adjusted to a temperature of 70° C.

TABLE 4

| | |
|---|---|
| Calcium carbonate hollow particles 2 | 40 parts by mass |
| Carbon black (Trade name: Tokablack #7360SB, manufactured by Tokai Carbon Co., Ltd.) | 40 parts by mass |
| Zinc stearate (Trade name: SZ-2000, manufactured by Sakai Chemical Industry Co., Ltd.) | 1 part by mass |
| Zinc oxide (Trade name: Zinc white, type 2, manufactured by Sakai Chemical Industry Co., Ltd.) | 2 parts by mass |

To the kneaded mixture, 0.8 part by mass of sulfur serving as a vulcanizing agent and 1.6 parts by mass of tetrabenzylthiuram disulfide (TBZTD) serving as a vulcanization accelerator were added. Then, the resultant was kneaded for 30 minutes with a twin roll type kneader cooled to a temperature of 20° C. to produce the electroconductive rubber composition 2.

Comparative Example 1

A charging roller 22 was obtained in the same way as in Example 1 except for adding 40 parts by mass of calcium carbonate solid particles (trade name: Nanox #30, manufactured by Maruo Calcium Co., Ltd.) in place of the calcium carbonate hollow particles 1 in Example 1.

The calcium carbonate solid particles were evaluated in the same way as in the production example 1, and it was found that the crystal structure thereof was a single calcite crystal structure. Table 5 shows the results.

The charging roller 22 was evaluated in the same way as in Example 1. Table 6 shows the results.

Comparative Example 2

A charging roller 23 was obtained in the same way as in Example 1 except for adding 40 parts by mass of styrene-acrylic hollow particles (trade name: SX8782, manufactured by JSR Corporation, hollowness: 50 volume %, volume average particle diameter: 1.0 μm) in place of the calcium carbonate hollow particles 1 in Example 1.

The charging roller 23 was evaluated in the same way as in Example 1. Table 6 shows the results.

Comparative Example 3

A charging roller 24 was obtained in the same way as in Example 1 except for adding 40 parts by mass of Shirasu balloon (trade name: SFB-081, manufactured by SHIRAX KAIHATSU, K.K., hollowness: 50 volume %, volume average particle diameter: 8.0 μm) in place of the calcium carbonate hollow particles 1 in Example 1. The charging roller 24 was evaluated in the same way as in Example 1. Table 6 shows the results.

TABLE 5

| | Particle | Particle production method | Shell crystal structure | Half width of (104) crystal plane in calcite crystal structure [°] | Hollowness [Volume %] | Volume average particle diameter [μm] |
|---|---|---|---|---|---|---|
| Production example 1 | Calcium carbonate hollow particles 1 | 1 | Calcite crystal structure | 0.204 | 12 | 3.4 |
| Production example 2 | Calcium carbonate hollow particles 2 | 1 | Calcite crystal structure | 0.206 | 34 | 3.6 |
| Production example 3 | Calcium carbonate hollow particles 3 | 1 | Calcite crystal structure | 0.209 | 52 | 3.7 |
| Production example 4 | Calcium carbonate hollow particles 4 | 3 | Calcite crystal structure | 0.232 | 38 | 7.9 |
| Production example 5 | Calcium carbonate hollow particles 5 | 3 | Calcite crystal structure | 0.260 | 32 | 6.8 |
| Production example 6 | Calcium carbonate hollow particles 6 | 3 | Calcite crystal structure | 0.289 | 28 | 6.2 |
| Production example 7 | Calcium carbonate hollow particles 7 | 3 | Calcite crystal structure + vaterite crystal structure | 0.316 | 27 | 5.8 |
| Production example 8 | Calcium carbonate hollow particles 8 | 2 | Calcite crystal structure | 0.293 | 37 | 8.6 |
| Production example 9 | Calcium carbonate hollow particles 9 | 2 | Calcite crystal structure (calcium carbonate) + sodium chloride type crystal structure (magnesium oxide) | 0.304 | 33 | 7.8 |

TABLE 6

| | Particle type | Addition number of parts [parts by mass] | Polar rubber of elastic layer | Charging roller No. | Initial tanδ | Tanδ after durability test | Banding evaluation |
|---|---|---|---|---|---|---|---|
| Example 1 | Calcium carbonate hollow particles 1 | 20 | Epichlorohydrin | 1 | 0.10 | 0.09 | 3 |
| Example 2 | Calcium carbonate hollow particles 1 | 40 | Epichlorohydrin | 2 | 0.14 | 0.13 | 3 |
| Example 3 | Calcium carbonate hollow particles 1 | 60 | Epichlorohydrin | 3 | 0.17 | 0.16 | 2 |
| Example 4 | Calcium carbonate hollow particles 1 | 80 | Epichlorohydrin | 4 | 0.16 | 0.15 | 2 |
| Example 5 | Calcium carbonate hollow particles 1 | 100 | Epichlorohydrin | 5 | 0.13 | 0.12 | 3 |
| Example 6 | Calcium carbonate hollow particles 2 | 20 | Epichlorohydrin | 6 | 0.18 | 0.16 | 2 |
| Example 7 | Calcium carbonate hollow particles 2 | 40 | Epichlorohydrin | 7 | 0.22 | 0.21 | 1 |
| Example 8 | Calcium carbonate hollow particles 2 | 60 | Epichlorohydrin | 8 | 0.25 | 0.23 | 1 |
| Example 9 | Calcium carbonate hollow particles 2 | 80 | Epichlorohydrin | 9 | 0.24 | 0.22 | 1 |
| Example 10 | Calcium carbonate hollow particles 2 | 100 | Epichlorohydrin | 10 | 0.20 | 0.18 | 2 |
| Example 11 | Calcium carbonate hollow particles 4 | 60 | Epichlorohydrin | 11 | 0.22 | 0.20 | 1 |
| Example 12 | Calcium carbonate hollow particles 5 | 60 | Epichlorohydrin | 12 | 0.18 | 0.16 | 2 |
| Example 13 | Calcium carbonate hollow particles 6 | 60 | Epichlorohydrin | 13 | 0.15 | 0.13 | 3 |
| Example 14 | Calcium carbonate hollow particles 7 | 60 | Epichlorohydrin | 14 | 0.09 | 0.07 | 3 |
| Example 15 | Calcium carbonate hollow particles 3 | 20 | Epichlorohydrin | 15 | 0.21 | 0.18 | 2 |
| Example 16 | Calcium carbonate hollow particles 3 | 40 | Epichlorohydrin | 16 | 0.25 | 0.21 | 1 |
| Example 17 | Calcium carbonate hollow particles 3 | 60 | Epichlorohydrin | 17 | 0.28 | 0.24 | 1 |
| Example 18 | Calcium carbonate hollow particles 3 | 80 | Epichlorohydrin | 18 | 0.26 | 0.22 | 1 |
| Example 19 | Calcium carbonate hollow particles 8 | 60 | Epichlorohydrin | 19 | 0.12 | 0.10 | 3 |
| Example 20 | Calcium carbonate hollow particles 9 | 60 | Epichlorohydrin | 20 | 0.08 | 0.06 | 3 |
| Example 21 | Calcium carbonate hollow particles 2 | 40 | NBR | 21 | 0.55 | 0.49 | 1 |
| Comparative Example 1 | Calcium carbonate solid particles | 40 | Epichlorohydrin | 22 | 0.04 | 0.03 | 4 |
| Comparative Example 2 | Styrene-acrylic hollow particles | 40 | Epichlorohydrin | 23 | 0.10 | 0.05 | 4 |
| Comparative Example 3 | Shirasu balloon | 40 | Epichlorohydrin | 24 | 0.09 | 0.05 | 4 |

It is to be noted that, in Table 6, NBR refers to an acrylonitrile-butadiene rubber.

The calcium carbonate hollow particles 1 to 3 are produced by the production method 1, the calcium carbonate hollow particles 4 to 7 are produced by the production method 3, and the calcium carbonate hollow particles 8 and 9 are produced by the production method 2. The calcium carbonate hollow particles 1 to 3 produced by the production method 1 each have a porous shell.

In any of Examples 6 to 10 and Example 21 using the calcium carbonate hollow particles 2, and Examples 15 to 18 using the calcium carbonate hollow particles 3, satisfactory results of a banding evaluation of 1 to 2 are obtained. On the other hand, in Examples 1 to 5 using the calcium carbonate hollow particles 1, the banding evaluation is 2 to 3, which is considered to be caused by a low hollowness as described later.

In Example 11 using the calcium carbonate hollow particles 4, the banding evaluation is 1, which is considered to be caused by the fact that a half width and a hollowness are appropriate values as described later.

Further, in Example 12 using the calcium carbonate hollow particles 5, the banding evaluation is 2. However, when Example 12 is compared to Example 8 in which the calcium carbonate hollow particles 2 are added and to Example 17 in which the calcium carbonate hollow particles 3 are added, in terms of the same addition number of parts (60 parts by mass), the banding evaluation in Examples 8 and 17 is 1, which is higher evaluation than that of Example 12. It is to be noted that, in any of Examples 13, 14, 19, and 20 in which the calcium carbonate hollow particles 6, 7, 8, and 9 are added in amounts of 60 parts by mass each, the banding evaluation is 3. It is understood from those results that the banding evaluation is particularly excellent in the case of using calcium carbonate hollow particles each having a porous shell.

When attention is paid to the case where the addition number of parts of the calcium carbonate hollow particles is 60 parts by mass, it is understood that the banding evaluation is 1 in any of Example 8 in which the calcium carbonate hollow particles 2 are used, Example 17 in which the calcium carbonate hollow particles 3 are used, and Example 11 in which the calcium carbonate hollow particles 4 are used. Regarding the other calcium carbonate hollow particles, the banding evaluation is 2 in each of Example 3 in which the calcium carbonate hollow particles 1 are used and Example 12 in which the calcium carbonate hollow particles 5 are used, and the banding evaluation is 3 in each of Example 13 in which the calcium carbonate hollow particles 6 are used, Example 14 in which the calcium carbonate hollow particles 7 are used, Example 19 in which the calcium carbonate hollow particles 8 are used, and Example 20 in which the calcium carbonate hollow particles 9 are used.

That is, in the case of using the calcium carbonate hollow particles 2, 3, and 4, the excellent result of the banding evaluation of 1 is obtained. Herein, when attention is paid to the half width of an X-ray diffraction peak of a (104) crystal plane in a calcite crystal structure, the calcium carbonate hollow particles 2, 3, and 4 each have a half width of 0.25° or less, and the calcium carbonate hollow particles 5 to 9 each have a half width of more than 0.25°.

It can be concluded from the above-mentioned results that the satisfactory banding evaluation in Example 8, Example 17, and Example 11 is caused by the fact that the half width of an X-ray diffraction peak of a (104) crystal plane in a calcite crystal structure is 0.25° or less.

The calcium carbonate hollow particles 1 also have a half width of 0.25° or less, but the banding evaluation thereof is 2. The reason for this is considered as follows: the hollowness of the calcium carbonate hollow particles 1 is as low as 12 volume %, while the hollowness of the calcium carbonate hollow particles 2 is 34 volume %, the hollowness of the calcium carbonate hollow particles 3 is 52 volume %, and the hollowness of the calcium carbonate hollow particles 4 is 38 volume %.

This application claims the benefit of Japanese Patent Application No. 2012-271507, filed Dec. 12, 2012 and Japanese Patent Application No. 2013-250455, filed Dec. 3, 2013, which are hereby incorporated by reference herein in their entirety.

What is claimed is:

1. A charging member, comprising:
a substrate; and
an elastic layer,
wherein the elastic layer contains
a rubber having a polar group and
a hollow particle having a shell containing a crystal of calcium carbonate.

2. The charging member according to claim 1, wherein the hollow particle has a porous shell formed of the crystal of calcium carbonate.

3. The charging member according to claim 1, wherein the hollow particle has a hollowness of 20 volume % or more and 60 volume % or less.

4. The charging member according to claim 1, wherein the crystal of calcium carbonate has a calcite crystal structure.

5. The charging member according to claim 4, wherein the calcite crystal structure has a half width of an X-ray diffraction peak of a (104) crystal plane of 0.25° or less.

6. The charging member according to claim 5, wherein the half width is 0.05° or more.

7. The charging member according to claim 1, wherein the hollow particle has a volume average particle diameter of 1.0 μm or more and 20.0 μm or less.

8. The charging member according to claim 1, wherein the rubber having a polar group comprises any one of an epichlorohydrin rubber and an acrylonitrile-butadiene rubber.

9. An electrophotographic apparatus, comprising:
a charging member; and
an electrophotographic photosensitive member disposed in contact with the charging member,
wherein the charging member comprises the charging member according to claim 1.

10. A process cartridge integrally holding a charging member and at least an electrophotographic photosensitive member, the process cartridge being configured to be detachable from a main body of an electrophotographic apparatus,
wherein the charging member comprises the charging member according to claim 1.

* * * * *